Feb. 9, 1954

R. E. GRAHAM 2,668,873

VERTICAL SYNCHRONIZING SYSTEM

Filed Aug. 10, 1951

3 Sheets-Sheet 1

INVENTOR
R. E. GRAHAM
BY Hugh S. Wertz
ATTORNEY

INVENTOR
R. E. GRAHAM
BY Hugh S. Wertz
ATTORNEY

VERTICAL SYNCHRONIZING SYSTEM

Filed Aug. 10, 1951

3 Sheets-Sheet 3

INVENTOR
R. E. GRAHAM
BY Hugh S. Wertz
ATTORNEY

Patented Feb. 9, 1954

2,668,873

UNITED STATES PATENT OFFICE 2,668,873

VERTICAL SYNCHRONIZING SYSTEM

Robert E. Graham, Chatham, N. J., assignor to Bell Telephone Laboratories, Incorporated, New York, N. Y., a corporation of New York Application August 10, 1951, Serial No. 241,242

3 Claims. (Cl. 178—69.5)

This invention relates to synchronizing systems. More particularly it concerns synchronizing systems which make use of composite signals having different frequency components for transmission of the synchronizing information, as, for example, the standard RMA television synchronizing system which utilizes composite signals, comprising relatively short horizontal or line synchronizing pulses interposed with relatively longer serrated vertical or field synchronizing pulses, to control the vertical and horizontal sweep generators at the receiver to provide synchronization with the scanning process at the transmitter.

An object of this invention is to improve the synchronization in such systems which use composite synchronizing signals.

It will be convenient for purposes of analysis to describe the present invention specifically with reference to a standard RMA television synchronizing system, but it will be evident that the invention is not necessarily limited thereto.

In a typical television system, the basic arrangement for separating the horizontal and vertical synchronizing signals from the composite synchronizing information includes a differentiating circuit to which the composite signal is supplied for separating out the shorter line synchronizing pulses and an integrating circuit to which the composite signal is supplied for separating out the longer field synchronizing pulses. For effecting this separation, the integrating circuit is characterized by leakage sufficient for eliminating the effect of the short horizontal synchronizing pulses but insufficient to prevent the accumulation of charge during the longer field synchronizing pulses. Some point, usually about half the expected cumulative amplitude, is made the operating point for triggering the field sweep generator. The triggering time then coincides with the accumulation of the charge in the integrating circuit to this chosen operating amplitude.

However, this simple arrangement has for some time past been known to be not too well adapted for conventional interlaced scanning systems since interlacing results in non-uniformity between the even and odd-numbered fields of each television frame in the region of the vertical synchronizing pulses. This non-uniformity in turn leads to different triggering times as measured from the start of the field synchronizing pulse for two successive fields, and hence, uneven and inaccurate interlacing. To minimize the difference in wave form in the region of the vertical synchronizing pulse for even and odd-numbered scanning fields, it is now the practice to insert equalizing pulses at half-line intervals for a time before and after the field synchronizing pulses, so that in this region successive fields are made to be alike. Although this is, in general, satisfactory, for high fidelity receivers it is usually necessary to resort to still more sophisticated arrangements to obtain the desired degree of accuracy in timing. The present invention is concerned with this problem.

Accordingly, a more specific object of this invention is to facilitate and improve the separation of the component parts of a composite RMA synchronizing signal and thereby to increase the accuracy of interlacing.

In accordance with a preferred embodiment of the invention, the RMA composite synchronizing signal is applied to a low-pass filter having an upper cut-off frequency less than the frequency of the line synchronizing pulses but above that of the field synchronizing pulse and the output thereof is added to the original input signal. Thereafter, the resultant is applied to clipping means and there is derived a new series of serrated pulses which include only the vertical synchronizing information. This new series is applied to differentiating means and after a second clipping, there is derived a new series of pulses which can be used directly or after stretching for the synchronization of the vertical sweep generator.

The invention will be better understood with reference to the following more detailed description taken in connection with the accompanying drawings, in which.

Figure 1:
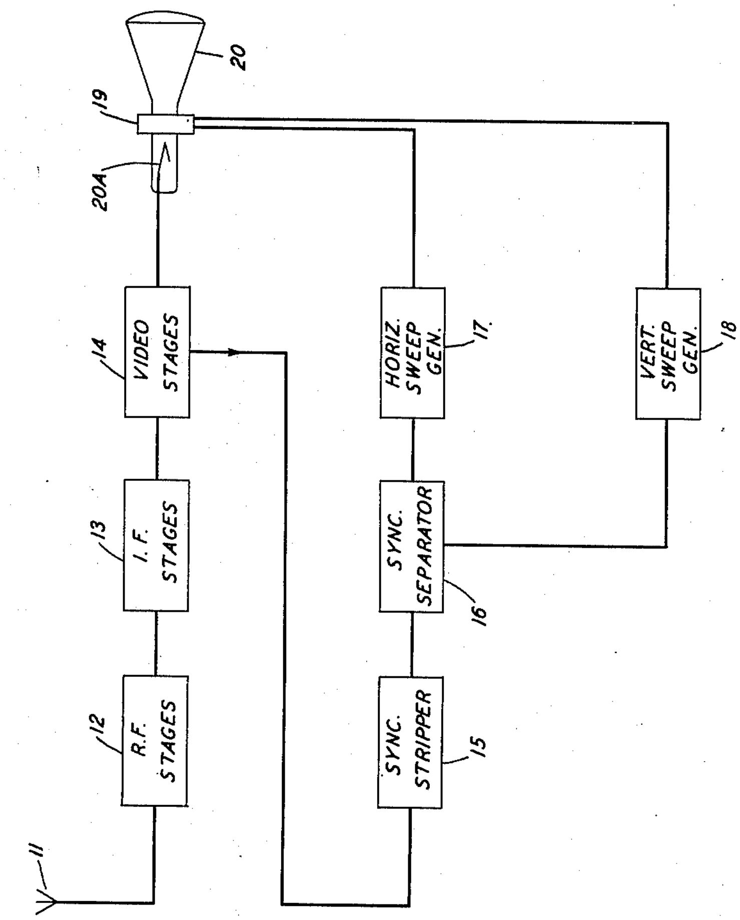
Fig. 1 shows, in block schematic form, the circuitry of a typical television receiver.
Figures 4A, 4B, 4C, 4D, 4E, 4F, 4G:
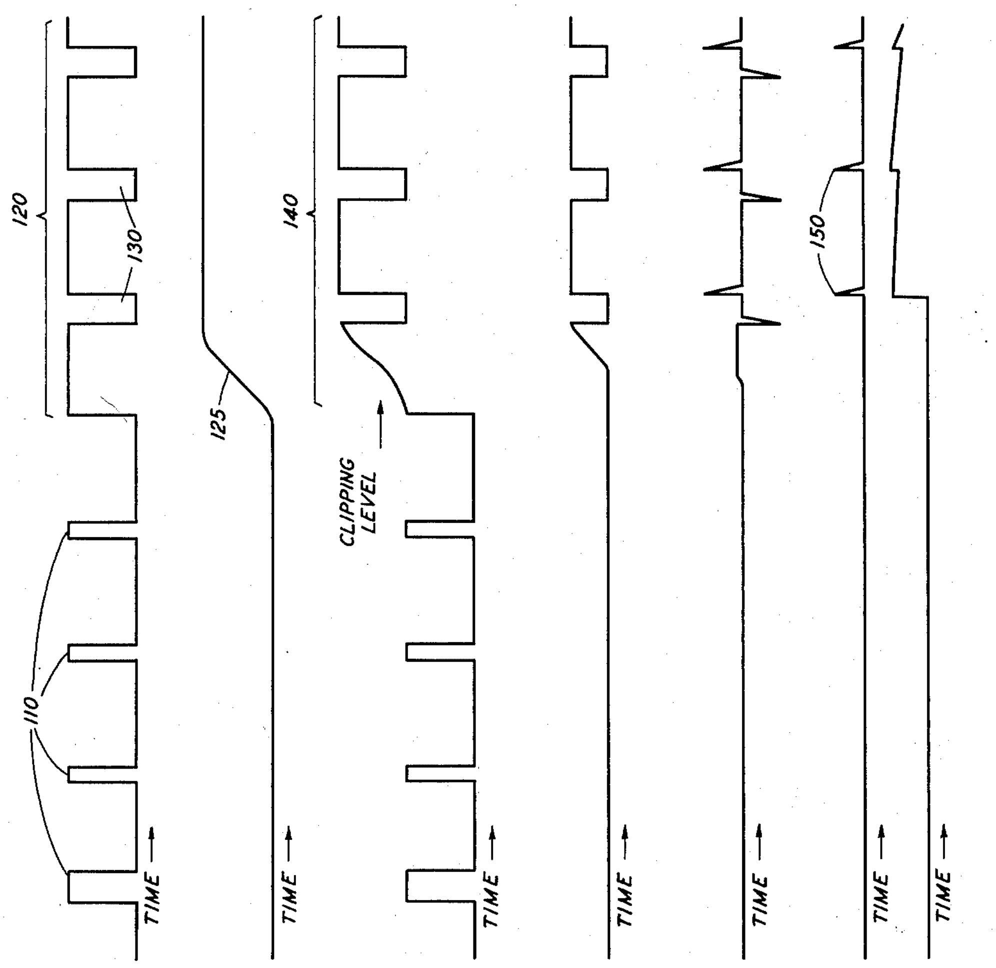

Referring now more particularly to the drawings, in Fig. 1 there is shown the circuitry of a typical television receiver. The transmitted radio frequency television signal is received by the antenna 11 and, thereafter, in the radio frequency stages 12 is amplified and converted to an intermediate frequency. In the intermediate frequency stages 13, this intermediate frequency signal is amplified further, and the video signal is detected therefrom. In the video stages 14, this signal is again amplified. At this point, the video signal includes both the picture and synchronizing information. Because it is usual to include the synchronizing information at amplitude levels which will not affect the picture on the viewing screen, the video signal can be applied directly to the intensity control element 20A of the viewing tube 20. However, for the recovery of the synchronizing information, it is first necessary to eliminate the picture signal, and so the video signal is applied to a synchronizing stripper 15 which removes the picture information and leaves only the synchronizing information. This synchronizing information is a composite signal which comprises a series of horizontal synchronizing pulses interspersed with a series of serrated vertical synchronizing pulses. The wave form of a portion of this composite signal is shown in Fig. 4A. This composite signal is thereafter applied to a synchronizing separator 16 which separates out the horizontal and vertical synchronizing pulses. These in turn are applied to the horizontal and vertical sweep generators, 17 and 18, respectively, for providing the deflecting sweep signals which are applied to corresponding deflecting means 19 of the viewing tube 20. The present invention is primarily concerned with improving the control of the sweep generators, more particularly the vertical sweep generator, and to this end provides an improved synchronizing separator arrangement which permits more accurate timing of the vertical sweep generator. The rest of the receiver may be as found in the typical commercial receiver.

Figures 2, 3:
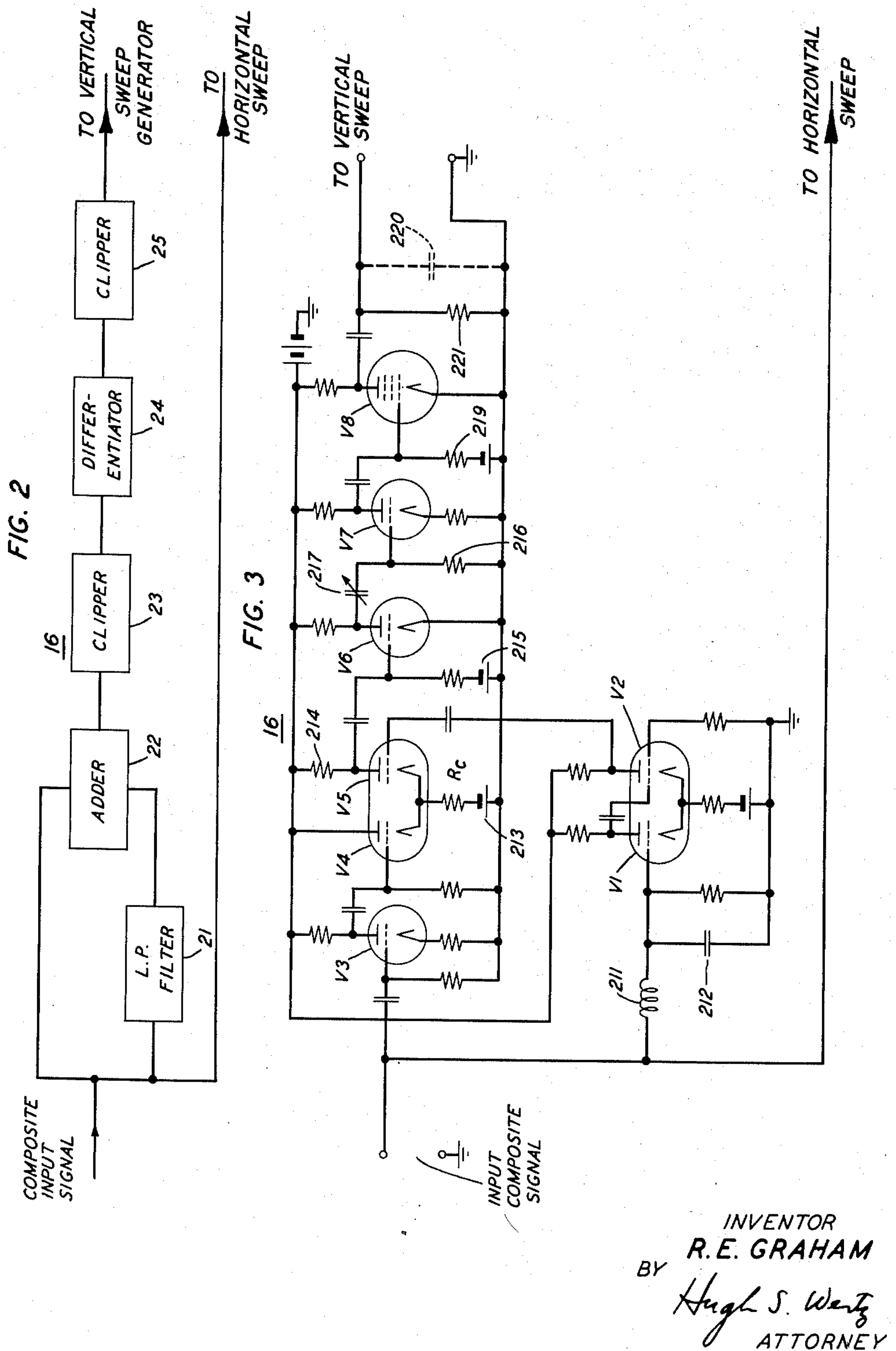
Fig. 2 shows, in block schematic form, a synchronizing separator in accordance with the present invention suitable for incorporation in the receiver shown in Fig. 1.
Fig. 3 shows, in schematic circuit form, one embodiment of the separator shown in Fig. 2, and Figs. 4A to 4G, inclusive, show wave forms that will be useful in describing the separator shown in Fig. 2.

Fig. 2 shows in block schematic form a synchronizing generator 16 in accordance with the invention, which, by way of example, will be discussed specifically with reference to a standard RMA television signal. The composite synchronizing signal which is derived from the synchronizing stripper 15 shown in the receiver of Fig. 1 has in the region of a vertical synchronizing pulse the wave form shown in Fig. 4A. It can be seen that each cycle of this wave comprises a series of short pulses 110 which comprise the line synchronizing pulses and equalizing pulses, and a longer pulse 120, having serrations 130, which is the field or vertical synchronizing pulse. This composite wave is applied to a low-pass filter 21 which is designed to have a cut-off frequency below the line frequency (15,725 cycles per second for the present RMA signal) and above the field frequency so that effectively the short pulses are filtered out, while the longer field pulse is smoothed of its serration. The wave form of the resultant is shown as curve 125 in Fig. 4B. It can be seen that curve 125 starts to rise in amplitude coincident with the leading edge of vertical synchronizing pulse 120 and attains an appreciable amplitude by the time of the first pulse serration, which amplitude is maintained substantially constant for the duration of the vertical synchronizing pulse. This filter output is then applied to adding means 22 to which is simultaneously applied the composite input signal. The resultant has the wave form shown in Fig. 4C. It is evident that this wave form represents the addition of the two wave forms shown in Figs. 4A and 4B. It will be noted that where the serrated vertical synchronizing pulse is combined with the output of the low-pass filter there results a serrated pulse 140 having an amplitude level considerably higher than at other portions of the cycle. The start of this pulse 140 coincides with the leading edge of the vertical synchronizing pulse 120 and the serrations in these two pulses are coincident. The output of this adder 22 is then applied to the clipper 23 whose level is chosen to pass only amplitudes in excess of the maximum amplitude of the composite input signal. The resultant, which now includes only vertical synchronizing information and has the wave form shown in Fig. 4D, is thereafter applied to the differentiator 24 whose output will be the series of sharp positive and negative pulses shown in Fig. 4E, which coincide, respectively, with leading and trailing edges of the clipper output shown in Fig. 4D. This series may, if desired, be used directly for control of a suitable sweep generator, but in the preferred embodiment this series of pulses is further applied to suitable means, as the clipper 25, for removing the negative pulses and leaving the series of positive pulses 150 which results in a signal whose wave form is as shown in Fig. 4F. The first of these pulses occurs sharply and regularly at the leading edge following the first vertical pulse serration and provides accurate timing for precise vertical synchronization. Similarly it would have been feasible to eliminate the positive pulses and to utilize the negative pulses instead. In instances where it is preferable to control the vertical sweep generator with a relatively long flat pulse rather than the series of short pulses 150, this series can be supplied to conventional pulse stretching means from which there will be derived a synchronizing signal whose wave form is of the kind shown in Fig. 4G.

Fig. 3 shows in schematic diagram form an illustrative circuit designed to perform the functions of the block form arrangement shown in Fig. 2. The input composite signal, which has a wave form as shown in Fig. 4A with reversed polarity, is applied by way of the low-pass filter comprising the series inductance 211 and the shunt capacitance 212 to the control grid of tube V1 which along with tube V2 forms a simple two-stage regenerative amplifier which is well limited and whose output therefore will have the wave form 125 shown in Fig. 4B. This output is supplied from the plate of tube V2 to the control grid of the tube V5 which together with tube V4 forms a differential amplifier which serves as the adding means. At the same time, the composite input signal is being applied to the control grid of the amplifier tube V3 whose output is supplied to the control grid of the tube V4 of the differential amplifier. The differential amplifier which comprises the tubes V4 and V5 is designed to provide an output which is the arithmetic difference of the signals applied to its two control grids. By reversing the polarity of the input signal as is done by the amplifier V3 and then applying this reversed signal to the control grid of tube V4, there is effectively achieved in the differential amplifier addition of the two signals, as is called for in the block arrangement of Fig. 2. To obtain this differential action, the cathodes of tubes V4 and V5 are coupled together and connected through the common resistance $R_c$ to the negative terminal of the potential source or battery 213, and the value of resistance $R_c$ is chosen so that $$R_c >> \frac{1}{g_m}$$

where $g_m$ is the transconductance of each of the tubes V4 and V5. The resultant is derived across the resistance 214 in the plate circuit of tube V5, and has the wave form shown in Fig. 4C. This output is applied to the control grid of tube V6 which is operated as a clipper to provide an output signal only when the input signal has an amplitude in excess of the clipping level shown in Fig. 4C. This clipping level can be set as desired by adjustment of the voltage source 215 in the control grid circuit of tube V6, which source fixes the negative bias on the control grid thereof. In other respects, tube V6 is operated as a conventional amplifier. The clipped output, which has the wave form shown in Fig. 4D, except that the polarity has been reversed by the action of tube V6, is then differentiated by the resistance-capacitance circuit 216, 217 and there results the output whose wave form is shown in Fig. 4E except that the polarity is reversed. The resultant series of pulses can be used directly for control of some of the vertical sweep generator, or if preferred, the wave form shown in Fig. 4G can be obtained by further clipping and pulse stretching. To this end, the differentiated signal is applied to the amplifier stage V7 which provides phase reversal and whose output thereafter resembles the series of pulses shown in Fig. 4E. This series of pulses is then applied to the control grid of the tube V8 which acts both as a clipper and as a pulse stretcher. As has been described with reference to tube V6, the clipping level of tube V8 can be fixed as desired by adjustment of the negative grid bias provided by the voltage source 219 in the grid circuit thereof. The pulse stretching is accomplished by charging the stray capacitance 220 through tube V8 and by making its discharge path, shown as the resistance 221, a suitably high impedance.

It should be evident to a worker in the television circuit art that various other circuit arrangements can be devised consistent with the principles set forth in connection with the block schematic of Fig. 2. In particular, it is possible to simplify the circuitry by making some of the circuit elements do double duty, a consideration which has been disregarded in this particular arrangement in order to achieve a more logical and complete exposition of the general principles of the invention.

What is claimed is:

1. A synchronizing separator for deriving vertical synchronizing signals in a television receiver comprising an input source of a composite synchronizing signal including a first series of pulses recurrent at the television line frequency and a second series of longer serrated pulses recurrent at the television field frequency, low-pass filter means supplied with said composite synchronizing signal having an upper cut-off frequency below said line frequency and above said field frequency for providing a filtered output, adding means supplied with said filtered output and said composite synchronizing signal for providing a combined output, and clipping means supplied with said combined output for deriving a signal characteristic of the second series of pulses.

2. A synchronizing separator for deriving vertical synchronizing signals for a television receiver comprising an input source of a composite synchronizing signal including a first series of pulses recurrent at the television line frequency and a second series of longer serrated pulses recurrent at the television field frequency, low-pass filter means having an upper cut-off frequency below said line frequency and above said field frequency, means for adding the input composite signal and the filtered output for deriving a combined output, first clipping means supplied with said combined output for deriving a third series of pulses characteristic of the second series of serrated pulses, differentiating means supplied with the third series of pulses for deriving a series of negative and positive pulses coinciding with the edges of said third series of pulses, and means utilizing the pulses of a particular polarity of said last-mentioned series for providing a vertical synchronizing signal.

3. A synchronizing separator for deriving vertical synchronizing signals in a television receiver comprising an input source of a composite synchronizing signal including a first series of pulses recurrent at the television line frequency and a second series of longer serrated pulses recurrent at the television field frequency, low-pass filter means supplied with said composite synchronizing signal having an upper cut-off frequency below said line frequency and above said field frequency for providing a filtered output, adding means comprising a two-tube amplifier supplied with said filter output and said composite synchronizing signal for providing a combined output, and clipping means supplied with said combined output for deriving a signal characteristic of the second series of pulses.

ROBERT E. GRAHAM.

References Cited in the file of this patent

UNITED STATES PATENTS

| Number | Name | Date |
|---|---|---|
| 2,292,148 | Moe | Aug. 4, 1942 |
| 2,511,146 | Beste | June 13, 1950 |
| 2,521,504 | Dome | Sept. 5, 1950 |